United States Patent
Chou et al.

(10) Patent No.: US 7,735,139 B1
(45) Date of Patent: Jun. 8, 2010

(54) IN-LINE SCANNING OF NETWORK DATA IN AN ASYMMETRIC ROUTING ENVIRONMENT

(75) Inventors: Chih-Chieh Chou, Taipei (TW); Tsung-Lin Yu, Xindian (TW)

(73) Assignee: Trend Micro Incorporated, Tokyo (JP)

( * ) Notice: Subject to any disclaimer, the term of this patent is extended or adjusted under 35 U.S.C. 154(b) by 1057 days.

(21) Appl. No.: 11/435,477

(22) Filed: May 17, 2006

(51) Int. Cl.
*G06F 21/00* (2006.01)
*G06F 11/30* (2006.01)
*G06F 15/16* (2006.01)

(52) U.S. Cl. ........................ 726/24; 709/224
(58) Field of Classification Search ................ None
See application file for complete search history.

(56) References Cited

U.S. PATENT DOCUMENTS

| | | | |
|---|---|---|---|
| 5,623,600 A | | 4/1997 | Ji et al. |
| 6,092,194 A * | | 7/2000 | Touboul ................ 726/24 |
| 6,119,236 A * | | 9/2000 | Shipley ................ 726/22 |
| 6,154,844 A * | | 11/2000 | Touboul et al. .......... 726/24 |
| 6,304,975 B1 * | | 10/2001 | Shipley ................ 726/22 |
| 6,519,703 B1 * | | 2/2003 | Joyce ................. 726/22 |
| 6,804,780 B1 * | | 10/2004 | Touboul .............. 713/181 |
| 7,287,278 B2 * | | 10/2007 | Liang ................. 726/22 |
| 7,386,888 B2 * | | 6/2008 | Liang et al. ........... 726/23 |
| 7,512,808 B2 * | | 3/2009 | Liang ................ 713/188 |
| 7,523,493 B2 * | | 4/2009 | Liang et al. ........... 726/13 |
| 7,565,550 B2 * | | 7/2009 | Liang et al. ........... 713/188 |
| 7,565,693 B2 * | | 7/2009 | Shin et al. ............. 726/23 |
| 2007/0118896 A1 * | | 5/2007 | Soejima et al. ......... 726/22 |
| 2009/0165137 A1 * | | 6/2009 | Yoo et al. ............. 726/24 |

* cited by examiner

*Primary Examiner*—Christopher A Revak
(74) *Attorney, Agent, or Firm*—Okamoto & Benedicto LLP

(57) ABSTRACT

In one embodiment, network data exchanged between a client computer and a remote server computer are scanned for computer viruses at a first network security computer. The first network security computer creates connection information about the connection between the client computer and the server computer, and registers that connection information with a second network security computer that may receive network data transmitted in the connection. This allows the second network security computer to forward to the first network security computer network data transmitted in the connection even when the first and second network security computers are configured for asymmetric routing.

7 Claims, 5 Drawing Sheets

IN-LINE SCANNING OF NETWORK DATA IN AN ASYMMETRIC ROUTING ENVIRONMENT

BACKGROUND OF THE INVENTION

1. Field of the Invention

The present invention relates generally to data communications, and more particularly but not exclusively to scanning of data transmitted over computer networks.

2. Description of the Background Art

Computer viruses, worms, Trojans, and spyware are examples of malicious codes that have plagued computer systems throughout the world. Although there are technical differences between each type of malicious code, malicious codes are commonly collectively referred to as "viruses." For example, commercially available "antivirus software" is designed to scan a computer for viruses as well as worms and other malicious codes.

A computer network may employ an antivirus as a protective measure against viruses. For example, antivirus software may be installed in a gateway, router, or other centralized network component to scan network data (e.g., packets transmitted over the network) for viruses. As a further example, a gateway with antivirus components may scan packets exchanged between a client computer within the network and a server computer outside the network. In that scenario, the gateway is in-line with the client computer and server computer, and scans packets exchanged between the two. Antivirus components capable of in-line virus scanning are commercially available from several vendors including Trend Micro, Inc.

High-availability computing environments are those capable of continuous operation. Typically, in a high-availability environment, network components that provide critical services are deployed with redundancy. For example, redundant network security computers may be employed to scan network data. While deployment of redundant security computers makes the computer network more robust, it complicates in-line scanning because there are several computers available to scan packets leaving and entering the network and improper or lack of coordination between these computers may result in some packets not being scanned at all.

SUMMARY

In one embodiment, network data exchanged between a client computer and a remote server computer are scanned for computer viruses at a first network security computer. The first network security computer creates connection information about the connection between the client computer and the server computer, and registers that connection information with a second network security computer that may receive network data transmitted in the connection. This allows the second network security computer to forward to the first network security computer network data transmitted in the connection even when the first and second network security computers are configured for asymmetric routing.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

Embodiments of the present invention are described in the context of antivirus programs for illustration purposes only. In light of the present disclosure, those of ordinary skill in the art will appreciate that embodiments of the present invention may be generally employed in computer security and screening applications. For example, embodiments of the present invention may also be employed in anti-phishing and anti-spam applications.

Figure 1:
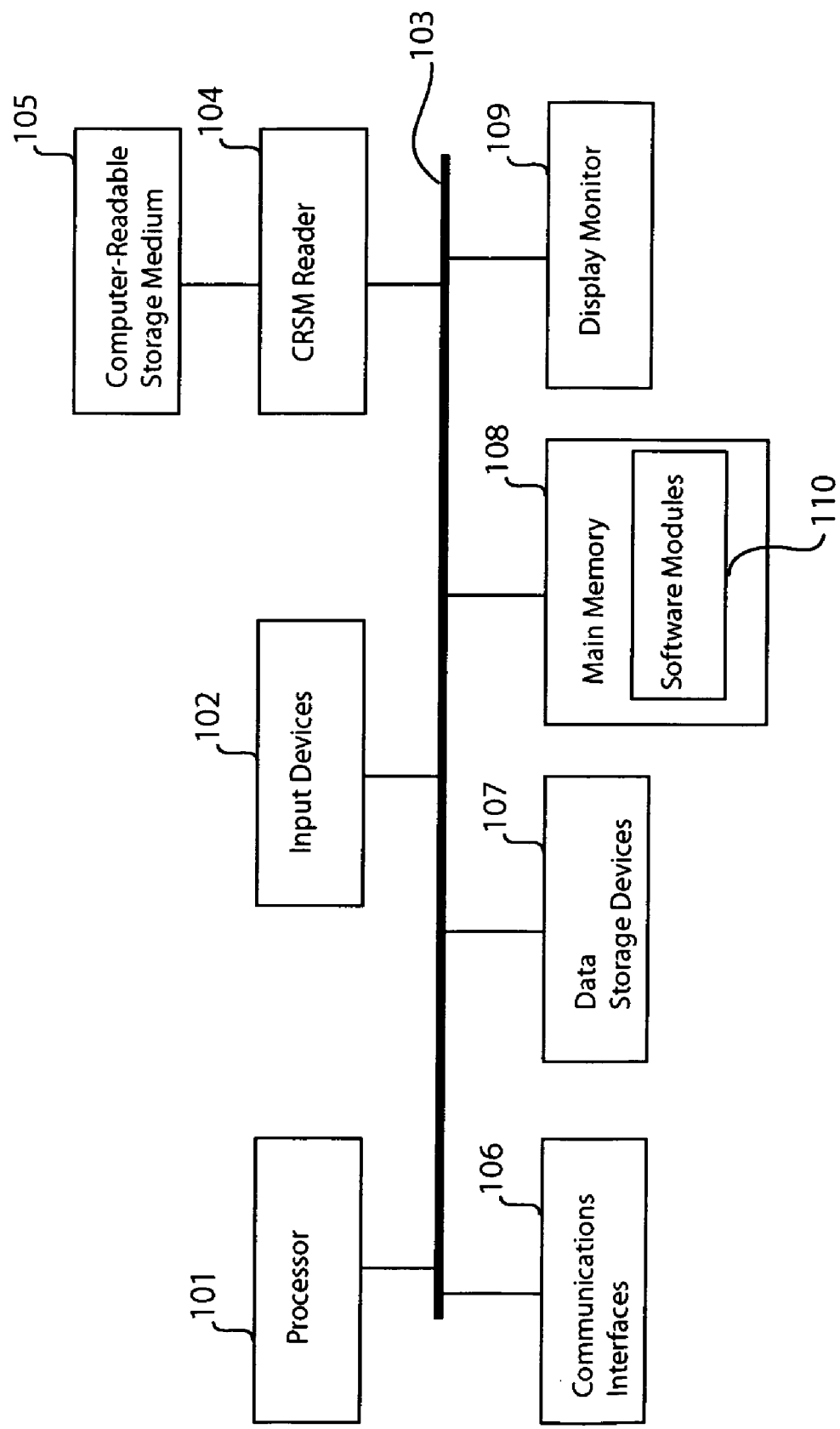
FIG. 1 shows a schematic diagram of an example computer that may be used in embodiments of the present invention.

Referring now to FIG. 1, there is shown a schematic diagram of an example computer that may be used in embodiments of the present invention. The computer shown in the example of FIG. 1 may be employed as a network security computer, for example. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., cathode ray tube, flat panel display), communications interfaces 106 (e.g., network adapters, modems) for communicating over computer networks, one or more data storage devices 107 (e.g., hard disk drive, optical drive, FLASH memory), and a main memory 108 (e.g., RAM). Software embodiments may be stored in a computer-readable storage medium 105 for reading into a data storage device 107 or main memory 108. Software embodiments may also be received over a computer network by way of a communications interface 106. In the example of FIG. 1, main memory 108 includes software modules 110, which may comprise software components of a later described network security computer 450 (see FIG. 5). The software modules 110 may be executed by processor 101.

Figure 2:
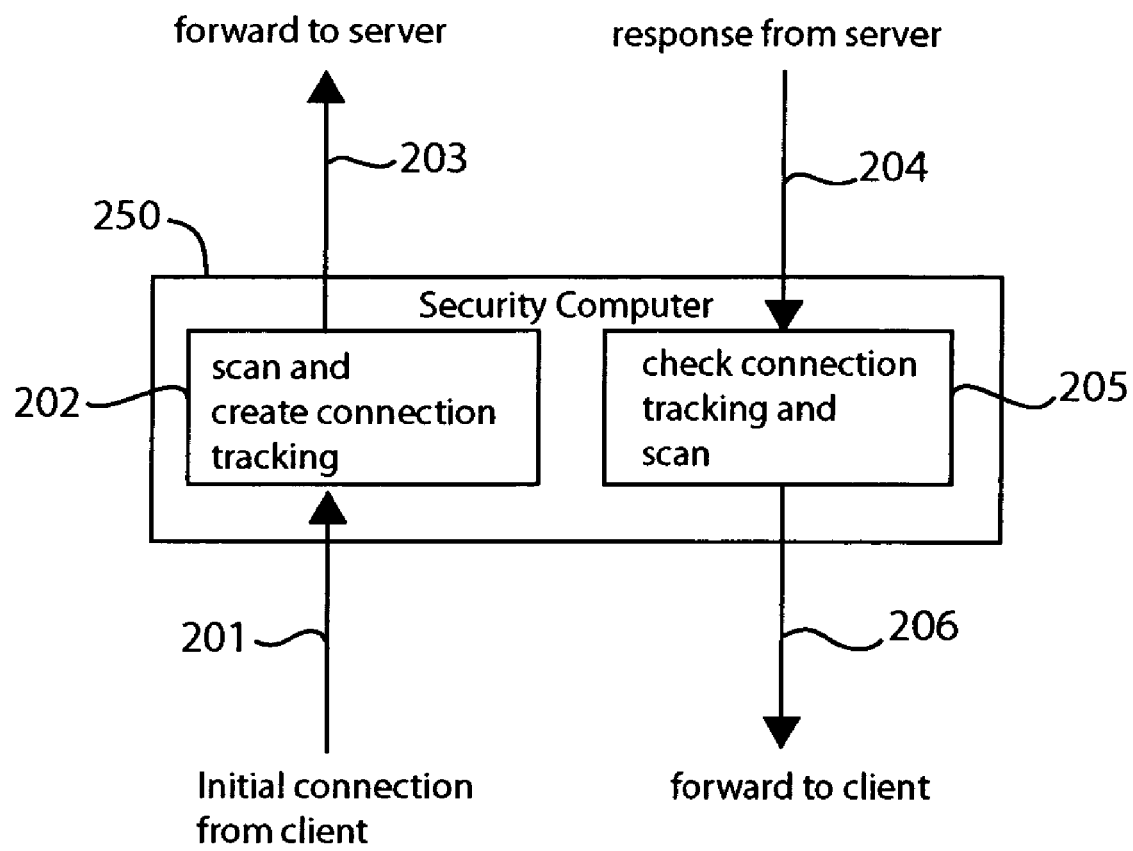
FIG. 2 shows a flow diagram of an example in-line scanning sequence performed by a network security computer.

FIG. 2 shows a flow diagram of an example in-line scanning sequence performed by a network security computer 250. The scanning is in-line in that it is performed on network data in transit between two computers communicating in a connection. In the example of FIG. 2, the security computer 250 scans network data exchanged between a client computer and a server computer. The in-line scanning sequence begins with the client computer initiating connection by sending packets ("client packets") to the server computer (arrow 201). The client packets are received by the security computer 250, which scans the client packets for viruses and creates connection tracking information (box 202). A connection tracking information identifies the computers communicating in a particular connection. The security computer 250 forwards the client packets to the server computer (arrow 203), which responds by sending packets ("server packets") to the client computer (arrow 204). The security computer 250 receives the server packets, checks its connection tracking information to identify the client computer as the intended recipient of the server packets, and then scans the server packets for viruses (box 205). The security computer 250 forwards the server packets to the client computer (arrow 206).

In a high-availability (HA) computing environment, there will be more than one security computer performing in-line virus scanning. Some high-availability computing environments may balance the in-line scanning load such that the security computer that scans the client packets may not be the same security computer that scans the server packets. Depending on implementation, this may result in some packets not getting scanned as will now be explained with reference to FIG. 3.

Figure 3:
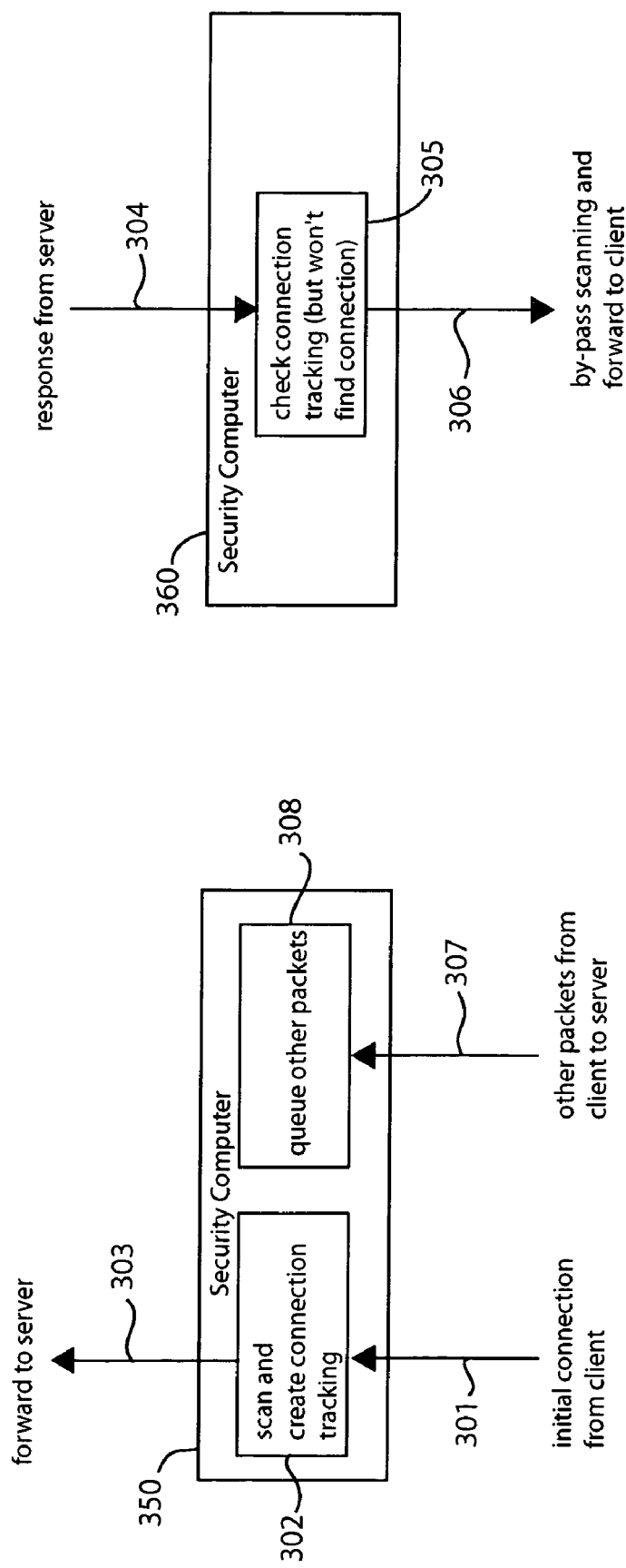
FIG. 3 shows a flow diagram of an example in-line scanning sequence in a high-availability computing environment.

FIG. 3 shows a flow diagram of an example in-line scanning sequence in a high-availability computing environment. In the example of FIG. 3, the security computers 350 and 360 comprise redundant computers that are load balanced. With load balancing, in-line scanning tasks are distributed among available security computers. This results in asymmetric routing, meaning the security computer through which the client packets are sent may not be the same security computer that will receive the server packets.

Referring to FIG. 3, the client computer sends client packets to the server computer by way of the security computer 350 (arrow 301). The security computer 350 scans the client packets for viruses and creates connection tracking information (box 302). The connection tracking information may be stored in a table ("connection table") maintained by the security computer 350. The security computer 350 forwards the client packets to the server computer (arrow 303). In response to the client packets, the server computer sends server packets to the client computer (arrow 304). Because of asymmetric routing brought about by load balancing, the security computer 360, instead of the security computer 350, receives the server packets. The security computer 360 checks available connection tracking information to determine where to forward the server packets (box 305). Unfortunately, because the server packets are in response to client packets sent through another network security computer, the security computer 360 will not find any connection tracking information for the client computer and the server computer. In that case, security computer 360 may forward the server packets to the client computer without scanning the server packets (arrow 306).

In the meantime, the client computer may send additional client packets to the server computer (arrow 307). However, since the security computer 350 has not received any response from the server computer, the security computer 350 may end up withholding the additional client packets and put them in a queue until responsive server packets are received and scanned for viruses. Because the server packets were already sent through the security computer 360, the security computer 350 may indefinitely prevent additional client packets from being forwarded to the server computer.

With in-line virus scanning, it is advantageous to scan both the client packets and the server packets to prevent the spread of viruses. An antivirus performing in-line scanning may thus not allow additional packets to be sent to a server whose response has not been verified as virus free. This poses a problem in asymmetric routing in that a network security computer may not have the chance to scan both the packets sent by the client and the responsive packets sent by the server. As will be more apparent below, embodiments of the present invention allow for in-line scanning even with asymmetric routing, such as in load balanced high-availability environments.

Figure 4:
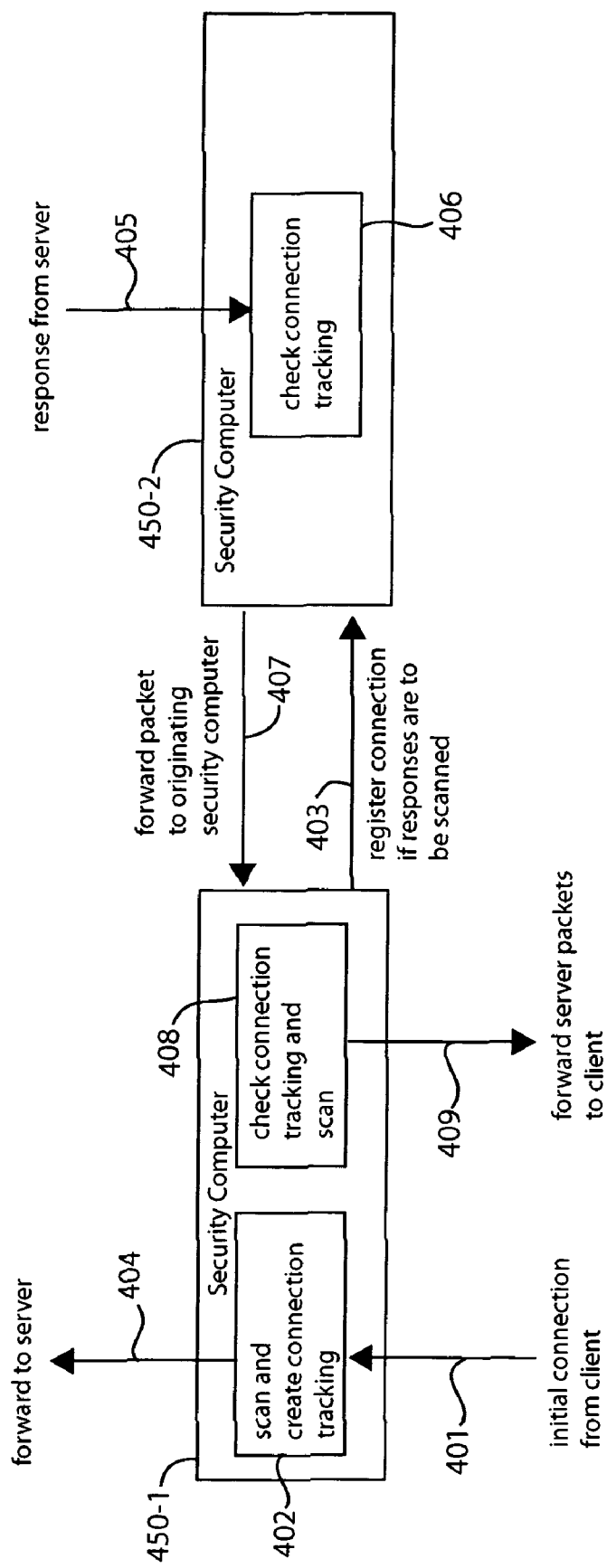
FIG. 4 shows a flow diagram of an in-line scanning sequence in accordance with an embodiment of the present invention.

Referring now to FIG. 4, there is shown a flow diagram of an in-line scanning sequence in accordance with an embodiment of the present invention. In the example of FIG. 4, network security computers 450-1 and 450-2 are configured for asymmetric routing in that either security computer may scan network data for the same connection. The asymmetric routing may be due to redundant operation and load balancing between the security computers 450 (i.e., 450-1, 450-2). With asymmetric routing, it is possible that connections originated through the security computer 450-1 may get response packets through the security computer 450-2, or vice versa.

As shown in FIG. 4, a client computer may initiate a connection (arrow 401) to a server computer outside the computer network to which the client computer and the security computers 450 belong. A "connection" is a two-way communication channel between a client and a server, and may be identified by a source IP address, a destination IP address, a source port number and a destination port number. The security computer 450-1 receives the initial connection packets from the client computer ("client packets"). The security computer 450-1 scans the client packets for viruses and creates connection tracking information (box 402). The connection tracking information may comprise information identifying the connection, the network security computer assigned to scan network data transmitted in the connection (the security computer 450-1 in this example), and the computers communicating using the connection (the client computer and the server computer in this example). The connection tracking information may be stored, for example, in a connection table in the security computer 450-1. The connection table may identify the connection between the client computer and the server computer by their respective IP addresses and port numbers, and the security computer assigned to scan network data for the connection by its Media Access Control (MAC) address.

In one embodiment, the security computer 450-1 registers the connection tracking information to one or more computers that may receive packets from the client computer and the server computer. In the example of FIG. 4, the security computer 4501-1 registers the connection tracking information by sending a copy of the connection tracking information to the security computer 450-2 (arrow 403). The security computer 450-2 adds the connection tracking information to its connection table, including information identifying the security computer 450-1 as being responsible for scanning all packets for that connection. Each security computer 450 may be identified by its MAC address.

Note that registering the connection tracking information to the security computer 450-2 may or may not be necessary depending on whether the data scanner in the security computer 450-1 or 450-2 is configured to scan response packets from the server. For performance reasons, some embodiments may limit scanning to particular connections and communication protocols. Advantageously, the security computers 450 are configured to scan both client and server packets for computer viruses, hence the step of registering the connection tracking information to the other security computer. As will be more apparent below, registering the connection tracking information to the security computer 450-2 allows the security computer 450-2 to forward response packets from the server computer to the security computer 450-1.

After registering the connection tracking information to the security computer 450-2, the security computer 450-1 forwards the client packets to the server computer (arrow 404). The server computer receives the client packets and responds by sending responsive packets ("server packets") to the client computer (arrow 405). The security computer 450-2 receives the server packets from the server computer and checks its connection table for connection tracking information (box 406). From the connection tracking information forwarded by the security computer 450-1 to the security computer 450-2, the security computer 450-2 determines that the server packets are from a connection initiated through the security computer 450-1 and need to be scanned there. Accordingly, the security computer 450-2 forwards the server packets to the security computer 450-1 (arrow 407). The security computer 450-1 receives the server packets, checks its connection table to identify the client computer as the intended destination of the server packets, and scans the server packets for viruses (box 408). After scanning the server packets, the security computer 450-1 forwards the server packets to the client computer (arrow 409). Note that if a virus is found in the server packets, the security computer 450-1 may initiate a cleaning action to prevent the spread of the virus, such as not forwarding the server packets to the client computer, removing the virus from the server packets prior to forwarding the server packets to the client computer, or other actions.

As can be appreciated, the embodiment of FIG. 4 allows for in-line scanning of network data in an asymmetric routing environment. This advantageously helps prevent the spread of computer viruses as it allows both outbound and inbound network data to be scanned. The impact on performance is relatively small even with load balancing because, in a true load balanced implementation, the probability of outbound data going through either the security computer 450-1 or 450-2 (or another computer) should be almost the same. Impact on performance may also be reduced by un-registering the connection tracking information once the connection is determined to be virus-free. In the example of FIG. 4, based on previously received and scanned server packets, the security computer 450-1 may determine that subsequent server packets in the same connection will not match any virus pattern currently available in the security computer 450-1. In that case, the security computer 450-1 may un-register the connection from the security computer 450-2 so that the security computer 450-2 forwards subsequent server packets directly to their destination client computer without going through the security computer 450-1.

Figure 5:
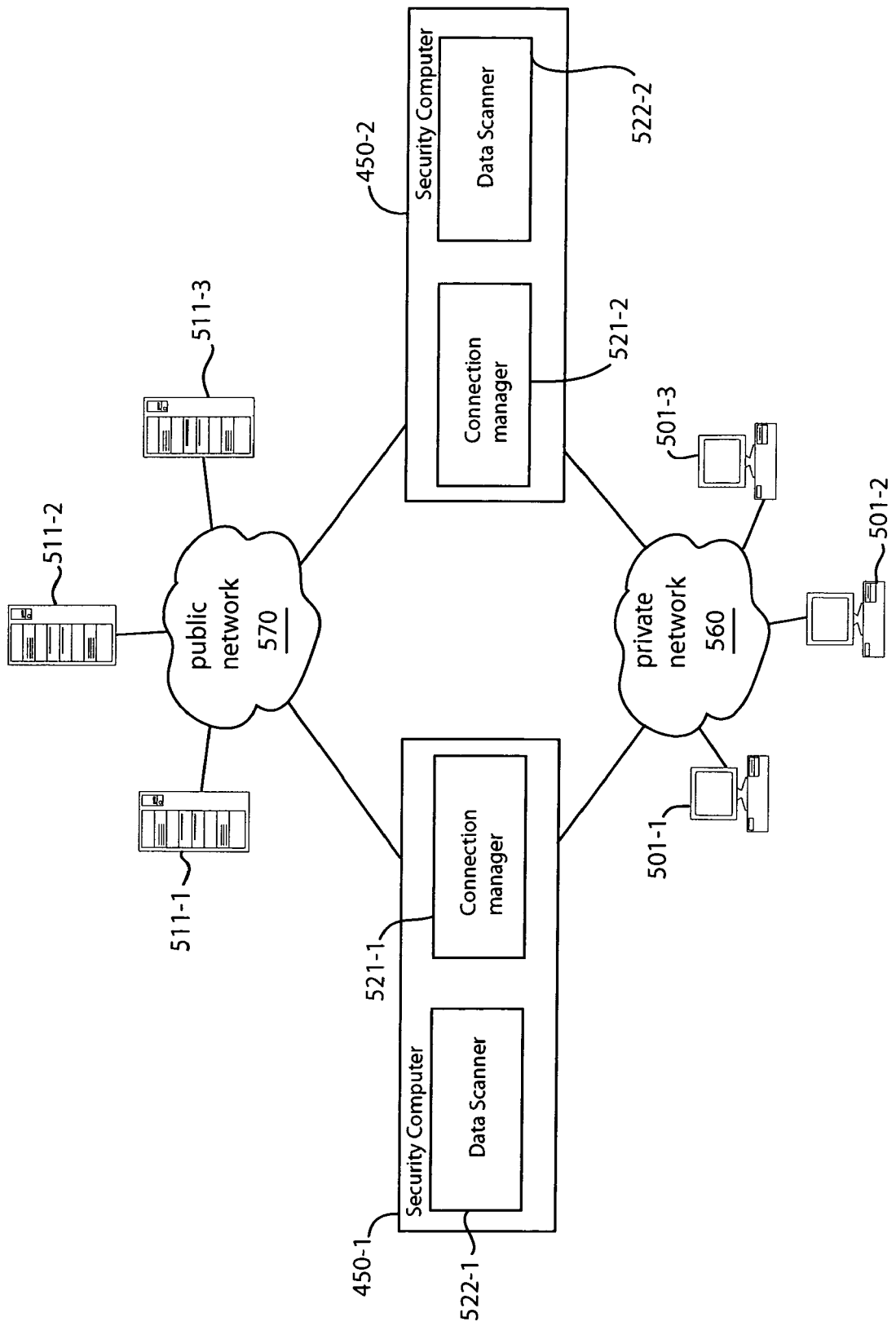
FIG. 5 shows a computing environment in accordance with an embodiment of the present invention.

FIG. 5 shows a computing environment in accordance with an embodiment of the present invention. In the example of FIG. 5, the computing environment includes the network security computers 450 configured for asymmetric routing, a private computer network 560, a public computer network 570, computers 501 (i.e., 501-1, 501-2, . . .) coupled to the private computer network 560, and computers 511 (i.e., 511-1, 511-2, . . .) coupled to the public computer network 570. The security computers 450 protect the private computer network 560 from computer viruses by, for example, in-line scanning network data in a connection between a computer 501 (e.g., a client computer) and a computer 511 (e.g., a server computer). As can be appreciated, each security computer 450 may comprise a single computer or several cooperative computers. In one embodiment, the public computer network 570 includes the Internet. A security computer 511 may comprise a gateway, router, appliance, or other types of computer suitable for data scanning.

In the example of FIG. 5, each security computer 450 comprises a data scanner 522 (i.e., 522-1, 522-2) and a connection manager 521 (i.e., 521-1, 521-2). In one embodiment, a data scanner 522 comprises computer-readable program code configured to scan network data for computer viruses. For example, in one embodiment where the computers 501 and the computers 511 communicate using the Hyper Text Transfer Protocol (HTTP), a data scanner 522 comprises an antivirus for HTTP. Such antivirus is commercially available from several vendors including Trend Micro, Inc. The security computers 450 may communicate with one another, e.g., to register connection tracking information or to route network data, over the private computer network 560.

In one embodiment, a connection manager 521 comprises computer-readable program code configured to receive network data entering and leaving the private computer network 560, examine the network data for destination and source IP addresses and ports, and forward the network data. The connection manager 521 may communicate with other connection managers 521 to send and receive connection tracking information. In one embodiment, the connection manager 521 registers with other connection managers 521 connection tracking information for newly initiated connections originated from within the private computer network 560. Registered connection tracking information may be stored in a connection table. This allows the connection managers 521 in the private computer network 560 to identify the security computer 450 assigned to scan packets entering the private computer network 560. The connection manager 521 routes packets coming from outside the private computer network 560 to the assigned security computer for scanning by the local data scanner 522 and then forwarding to the destination client computer. The security computers 450 may operate as previously explained with reference to FIG. 4.

Improved methods and apparatus for in-line scanning of network data in asymmetric routing environments have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of in-line scanning network data in asymmetric routing environments, the method comprising:

receiving a first set of data packets in a first security computer, the first set of data packets being transmitted as part of a connection between a client computer and a server computer, the first set of data packets being originated by the client computer in a computer network;

in the first security computer, scanning the first set of data packets for computer viruses;

registering a connection tracking information to a second security computer, the connection tracking information relating to the connection between the client computer and the server computer, the connection tracking information being registered by the first security computer to the second security computer;

forwarding the first set of data packets from the first security computer to a computer outside the computer network;

receiving in the second security computer a second set of data packets responsive to the first set of data packets; and in the second security computer, consulting the connection tracking information to identify the second set of data packets as being transmitted in the connection between the client computer and the server computer; and forwarding the second set of data packets from the second security computer to the first security computer.

2. The method of claim 1 further comprising:

in the first security computer, scanning the second set of data packets for computer viruses; and forwarding the second set of data packets to the client computer.

3. The method of claim 1 wherein the connection between the client computer and the server computer is in accordance with the Hyper Text Transfer Protocol (HTTP).

4. The method of claim 1 wherein the connection tracking information identifies the first security computer as being designated to scan network data in the connection between the client computer and the server computer.

5. The method of claim 1 wherein the connection tracking information identifies the client computer and the server computer by their respective IP addresses.

6. The method of claim 1 wherein the second set of data packets are received in the second security computer with the Media Access Control (MAC) address of the first security computer.

7. The method of claim 1 further comprising:

in the first security computer, scanning the second set of data packets for computer viruses; and not forwarding the second set of data packets to the client computer when a computer virus is found in the second set of data packets.

\* \* \* \* \*